Dec. 23, 1952     B. F. WILEY     2,622,334
LOGGING CALIPER

Filed March 4, 1949     2 SHEETS—SHEET 1

INVENTOR.
B.F. WILEY
BY Hudson & Young
by L. Malcolm Oberlin
ATTORNEYS

Dec. 23, 1952　　　　B. F. WILEY　　　　2,622,334
LOGGING CALIPER
Filed March 4, 1949　　　　　　　　2 SHEETS—SHEET 2

INVENTOR.
B. F. WILEY
BY Hudson & Young
by L. Malcolm Oberlin
ATTORNEYS

Patented Dec. 23, 1952

2,622,334

UNITED STATES PATENT OFFICE 2,622,334

LOGGING CALIPER

Bruce F. Wiley, Bartlesville, Okla., assignor to Phillips Petroleum Company, a corporation of Delaware Application March 4, 1949, Serial No. 79,626

13 Claims. (Cl. 33—178)

This invention relates to a logging caliper for determining the diameter of a well or bore hole.

Heretofore, several different types of calipers have been devised for determining the diameter of wells or bore holes. In most of these devices, a series of caliper arms is urged outwardly from a casing by springs and each arm is geared to an individual variable resistance which indicates the angle at which the caliper arm is offset from the axis of the device. Problems are encountered in sealing such caliper devices, in providing an efficient means of latching the caliper arms in retracted position as the tool is lowered into a well or bore hole, and in providing pressure equalization between the interior and exterior of the tool.

It is an object of my invention to provide a logging caliper in which a plurality of arms are geared to a single shaft which operates a telemetering device, such as a variable resistor, so that only one such resistor is needed in the tool.

It is a further object of the invention to provide an efficient latching device for holding the arms in retracted position as the tool is lowered into the bore hole, this latching device being electromagnetically actuated when it is desired to release the arms to measure the diameter of the bore hole.

It is a still further object to provide a tool in which the interior is sealed and in which interior and exterior pressures are equalized.

It is a still further object to provide a tool which is simple to manufacture, of rugged construction, and which has a minimum of moving parts.

Various other objects, advantages and features of the invention will become apparent from the following detailed description, taken in conjunction with the accompanying drawings, in which.

Figure 1:
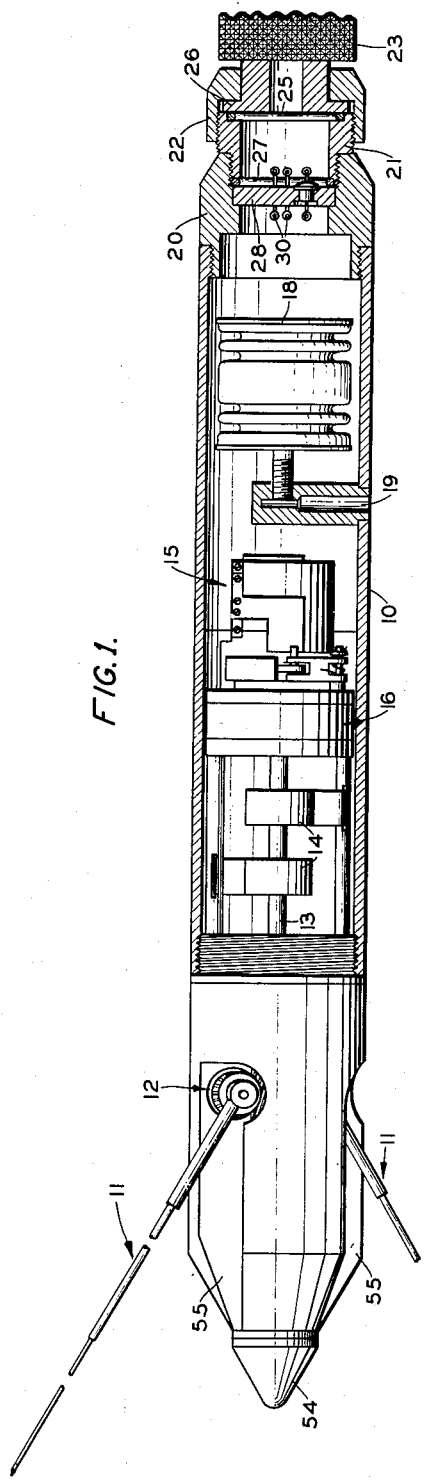
Figure 1 is a vertical sectional view, partially in elevation, of the logging caliper of this invention.

Referring now to the drawings in detail, and particularly to Figure 1, the logging caliper comprises a casing 10 which is sealed to prevent liquids in the bore hole from penetrating the interior of the tool. A series of caliper arms 11 is adapted to swing outwardly from the casing into engagement with the walls of the bore hole to determine the diameter thereof, and each caliper arm is connected by a gear train 12 to a shaft 13. Springs 14 are connected between the casing and shaft to urge the caliper arms 11 to their extended position in contact with the bore hole walls. During the lowering of the tool into a bore hole, an electromagnetic latching device 15 holds the shaft and thereby the caliper arms in retracted position, this latching device being releasable to permit the arms 11 to be urged outwardly by the springs 14. A telemetering device 16 is actuated by the shaft so that its angular position is indicated at the surface, the device preferably being a variable resistance having its contactor secured to the shaft 13.

Interior and exterior pressures are equalized by a bellows 18 mounted within the casing 10, this bellows communicating with the exterior of the tool through a passage 19. It will be understood that the interior of the tool is filled with a liquid insulating material, such as oil, while the bellows 18 is filled with the liquid or mud in the bore hole, the bellows equalizing the pressures between these two liquids. The upper end of the casing is closed off and sealed by a pair of telescoped, threaded coupling members 20, 21 and a cap 22 into which is fitted a cable socket 23. A sealing gasket 25 is mounted between a lock ring 26 and coupling member 21, and a gasket 27 is mounted between coupling member 21 and a retainer plate 28. This latter plate carries a plurality of feed-through terminals 30 connecting conductors, not shown, extending through cable socket 23 with the latching and telemetering devices 15, 16 within the casing. These feed-through terminals are of sealed construction so that leakage of liquid therethrough is effectively prevented.

Figure 5:
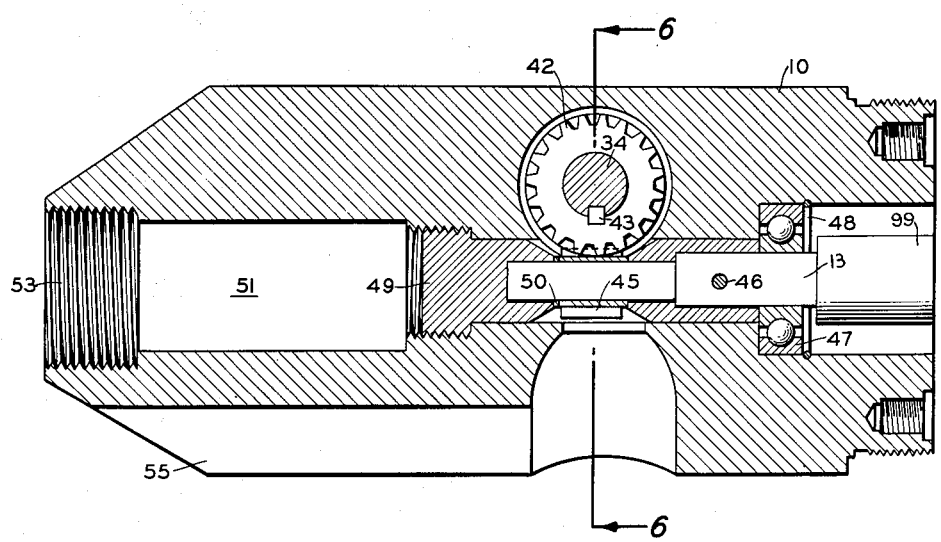
Figure 5 is an enlarged vertical sectional view of the caliper arm assembly.
Figure 6:
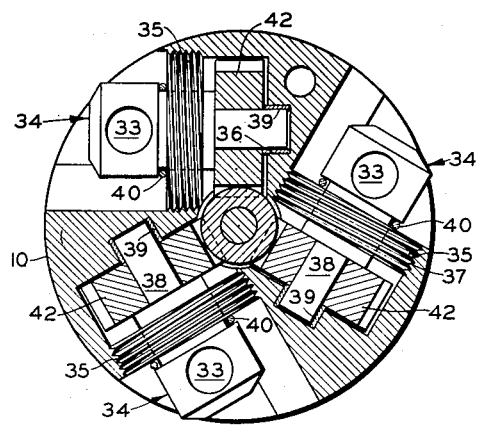
Figure 6 is a sectional view taken along the line 6—6 of Figure 5.

The detailed construction of the gear trains 12 connecting caliper arms 11 with shaft 13 is shown by Figures 5 and 6 from which it will be noted that each caliper arm 11 is formed from a number of telescoped sections, and fits into a socket 33 of a stub shaft 34. Each stub shaft is journalled in a bearing nut 35 and in a recessed portion 36 of the casing 10. Each bearing nut 35 is received by threads 37 formed in the casing 10, and the inner end 38 of each stub shaft is received within a bushing 39 carried by the recessed portion 36. In addition, the socket 33 on each stub shaft serves as a collar and a gasket 40 is disposed between this collar portion and the associated bearing nut 35. In this manner, each stub shaft is effectively sealed so that entrance of water or other liquid to the interior of the casing through the bearing assembly is effectively prevented.

The inner end of each stub shaft carries a spiral gear 42 which is secured thereto by a key 43, Figure 5. The shaft 13 carries a spiral gear 45 which meshes with the spiral gears 42 on the respective stub shafts 34. It will be noted that the gear 45 is secured to shaft 13 by a key 46 and that the shaft 13 is journalled in the casing 10 by a bearing 47 which is held in position by a clinch ring 48. The lower end of shaft 13, which is secured to the upper portion of said shaft by coupling member 99, is received within a thrust screw 49 which cooperates with a thrust washer 50. Accordingly, it will be apparent that the shaft 13 is freely journalled in the casing 10, and is mechanically connected to each of the caliper arms 11 by the stub shafts 34 and the spiral gears associated therewith.

The lower end of the casing 10 has an opening 51 formed therein which is provided with threads 53 which is adapted to receive a threaded nose 54, Figure 1. It will be further noted that the casing 10 is provided with slots or channels 55 for receiving the caliper arms 11 when they are in their retracted position, parallel to the shaft 13, the arms swinging outwardly away from the shaft responsive to shaft rotation.

Figure 2:
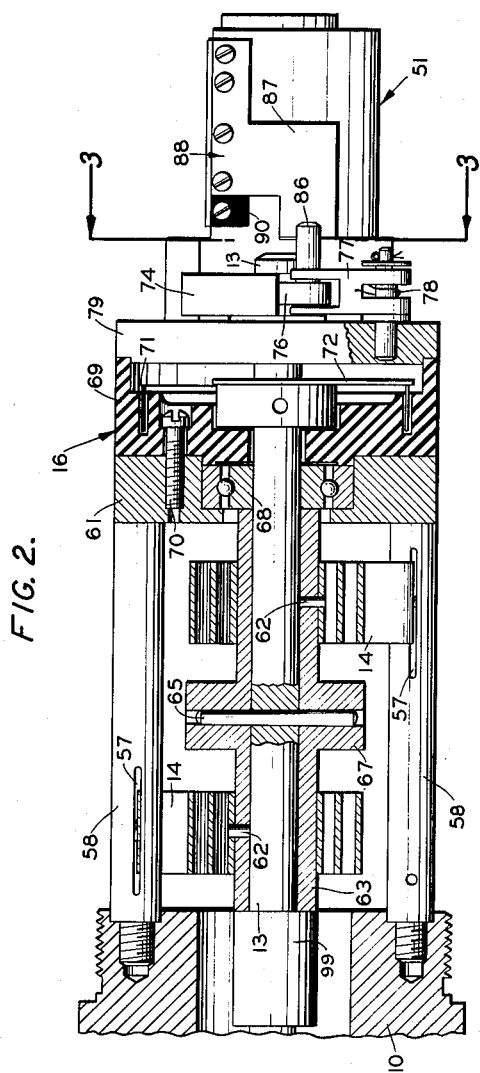
Figure 2 is an enlarged vertical sectional view of the latching and telemetering device.

Referring now to Figure 2, it will be noted that the springs 14 are of coiled configuration, and each spring has one end thereof fitted within a slot 57 formed in a rod 59 which is mounted between the lower portion of the casing 10 and a bearing retainer plate 61. The other end of each spring 14 is secured by a pin 62 to a sleeve 63 which is keyed to the shaft 13 by a pin 65. The pin 65 is mounted within a boss 67 protruding from the sleeve 63, this construction affording an easy method of "winding" the shaft 13, that is, of turning it in such direction as to apply tension to the springs 14.

The bearing retainer plate 61 carries a set of ball bearings 68 for receiving the upper end of shaft 13 and an insulating stator 69 is secured to the plate 61 by screws, one of which is shown at 70. The telemetering device 16 is carried by the stator 69, this device preferably consisting of a variable resistance including a resistance element 71 which is engageable by a contactor unit carried by member 72 which is secured to and rotatable with shaft 13. It will be apparent that the resistance of the unit 16 indicates the angular position of the shaft 13. The telemetering device may also be a variable condenser, or any other suitable device for transmitting a signal representing the shaft position to a distant point.

Figure 3:
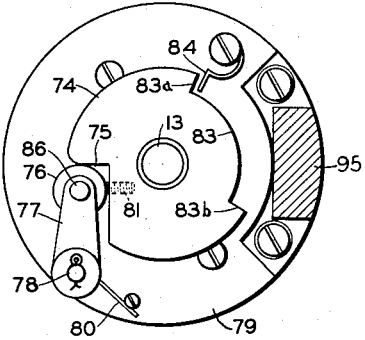
Figure 3 is a sectional view taken along the line 3—3 of Figure 2.

The electromagnetic latching device 15 includes a cam 74, Figure 3, which is carried by the upper end of the shaft 13, this cam having a lobe 75 which cooperates with a roller 76. This roller, in turn, is carried by an arm 77 pivotally mounted upon a pin 78 which protrudes upwardly from a metal plate 79 secured to the stator 69. The cam roller 76 is urged into engagement with cam lobe 75 by a spring 80 and the initial position of the roller against the cam may be varied by adjusting a set screw 81. The cam 74 is further provided with a groove 83 which cooperates with a stop 84 to limit the angular movement of the shaft.

Figure 4:
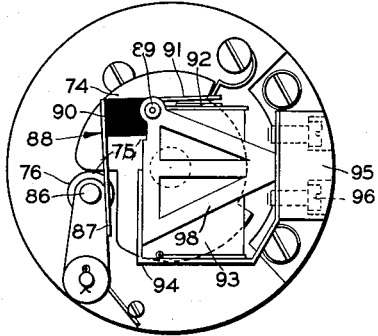
Figure 4 is a top view of the logging caliper.

The cam roller 76 is carried by a pin 86 which protrudes upwardly, Figure 2, from the cam assembly and this pin is adapted for engagement by a plate 87 forming a part of a pivoted armature 88. Referring to Figures 2 and 4, it will be noted that the armature 88 is pivoted upon a pin 89 positioned by bracket 90 and includes, in addition to the plate 87, an elongated block 90 of insulating material and a metal piece 91 which may be attracted by the core 92 of a pair of vertically spaced relay coils, one of which is shown at 93. The relay coils are mounted in a frame 94 which is secured to a support 95 by screws 96. The relay coils may be energized through conductors extending from cable socket 23, Figure 1, through the terminals 30 to the coil and, when so energized, the armature 88 pivots in a clockwise direction, Figure 4, against the bias of a light spring, not shown, with the result that plate 87 forces pin 86 and cam roller 76 out of engagement with cam surface 75, thereby releasing the shaft 13 for free angular movement between the limiting angular positions defined by stop 84 and groove 83. The sensitivity of the tripping mechanism may be controlled by adjustment of set screw 81, Figure 3, and it will be apparent that the cam roller functions as an overcenter latching device so that it may be tripped by a very small force acting thereon through the relay armature.

The operation of the caliper will now be apparent to those skilled in the art. When it is desired to make a survey of bore hole diameter, the caliper is prepared for lowering into the bore hole by moving the shaft against the force of springs 14 to a first angular position wherein the caliper arms 11 are collapsed and, preferably, parallel to the shaft 13. The described angular movement of the shaft may be conveniently obtained by applying force through a lever or other tool to the boss 67. When the shaft is in the described position, the parts of the latching device assume the positions shown in Figure 3 wherein the cam roller 76 is in engagement with cam lobe 75, and wherein stop 84 engages the surface 83a of groove 83. With the parts in this position, it will be understood that the springs 14 tend to cause rotation of the shaft in a counterclockwise direction, Figure 3. The tool is then lowered into the bore hole, either to the bottom thereof or to an appropriate level for starting the diameter survey. Thereupon, the coils 93 of latching device 15 are energized by current supplied from the surface with the result that armature 88 moves cam roller 76 out of engagement with cam surface 75. Thereupon, the shaft is urged in a counterclockwise direction, Figure 3, by springs 14 with the result that caliper arms 11 swing outwardly from the shaft into engagement with the walls of the bore hole. The telemetering device 16 then indicates the extent of shaft rotation toward a second angular position wherein stop 84 engages cam surface 83b, Figure 3, and thereby the angle of inclination of the arms 11 as well as the diameter of the bore hole. It will be understood, of course, that the unit 16 is connected in a suitable circuit so that the resistance variations may be detected from the surface as the caliper moves upwardly in the bore hole.

In a preferred embodiment of the invention, three caliper arms are utilized. In this connection, it is important to note that the three point engagement of the caliper arms with the bore hole walls results in positioning of the tool at the very center of the bore hole. That is to say, the three ends of the caliper arms determine a circle whose center is the axis of shaft 13 and this geometrical positioning of the tool in the bore hole continues despite variations in the diameter of the hole, even the relatively large variations caused by caving in soft formations. Accordingly, it is only necessary to utilize one variable resistance to indicate the true diameter of the hole which is in contrast with prior practice wherein a plurality of resistors was used, one for each caliper arm.

It will be further noted that the electromagnetic latching device is of simple construction, that it can be operated readily from the surface at any desired level in the bore hole. This again is contrary to prior practice according to which latching devices were operated only upon the tool engaging the bottom of the bore hole. Finally, I have provided a sealed casing wherein the interior and exterior pressures are equalized by the use of bellows 18. The type of connection between the caliper arms and the central shaft is one for which it is particularly difficult to provide adequate sealing. However, the structure of the present invention effectively excludes water or other extraneous bore hole liquids from the interior of the tool.

While the invention has been described in connection with a present preferred embodiment thereof, it is to be understood that this description is illustrative only and is not intended to limit the invention, the scope of which is defined by the appended claims.

Having described my invention, I claim:

1. A logging caliper comprising, in combination, a casing, a shaft journalled therein, a series of arms geared to said shaft and adapted to swing outwardly therefrom responsive to shaft rotation from a first angular position to a second angular position, means for moving said shaft toward said second angular position to swing said arms outwardly, and a telemetering device to indicate the angular position of said shaft.

2. A logging caliper comprising, in combination, a casing, a shaft journalled therein, a series of arms geared to said shaft and adapted to swing outwardly therefrom responsive to shaft rotation from a first angular position to a second angular position, a latching device for holding said shaft in said first angular position, means biasing said shaft toward said second angular position, means for releasing said latching device to permit the shaft to move toward said second angular position responsive to the action of said biasing means, and a telemetering device to indicate the angular position of said shaft.

3. A logging caliper comprising, in combination, a casing, a shaft journalled therein, a series of arms geared to said shaft and adapted to swing outwardly therefrom responsive to shaft rotation from a first angular position to a second angular position, a latching device for holding said shaft in said first angular position, means biasing said shaft toward said second angular position, means for releasing said latching device to permit the shaft to move toward said second angular position responsive to the action of said biasing means, a rheostat mounted in said casing, and means mechanically coupling the contactor of said rheostat to said shaft.

4. A logging caliper comprising, in combination, a water tight casing, a shaft journalled therein, a series of caliper arm assemblies geared to said shaft and extending through said casing, said caliper arms being adapted to swing outwardly from the shaft responsive to movement thereof from a first angular position to a second angular position, means for moving said shaft toward said second angular position to cause said arms to swing outwardly, means for sealing the region between the casing and each caliper arm assembly, and a telemetering device for indicating the angular position of said shaft.

5. A logging caliper comprising, in combination, a water tight casing, a shaft journalled therein, a series of caliper arm assemblies geared to said shaft and extending through said casing, said caliper arms being adapted to swing outwardly from the shaft responsive to movement thereof from a first angular position to a second angular position, means for sealing the region between the casing and each caliper arm assembly, means for biasing said shaft toward said second angular position, releasable means for latching said shaft in its first angular position, and a telemetering device for indicating the angular position of said shaft.

6. A logging caliper comprising, in combination, a liquid tight casing, a main shaft journalled therein, a worm gear mounted on said shaft, a plurality of shafts journalled in said casing in offset relation to said main shaft, a gear on each offset shaft meshing with the worm gear on said main shaft, means for sealing the region between the casing and each offset shaft, a caliper arm secured to the outer end of each offset shaft whereby each arm is adapted to swing outwardly from the main shaft responsive to shaft rotation from a first angular position to a second angular position, a latching device for holding said main shaft in said first angular position, means biasing said main shaft toward said second angular position, means for releasing said latching device to permit the main shaft to move toward said second angular position responsive to the action of said biasing means, and a telemetering device for indicating the angular position of said main shaft.

7. A logging caliper comprising, in combination, a casing, a main shaft journalled therein, a worm gear mounted on said shaft, a plurality of shafts journalled in said casing in offset relation to said main shaft, a gear on each offset shaft meshing with the worm gear on said main shaft, a bearing nut in said casing for accommodating each of said shafts, a collar on each shaft closely spaced to said bearing nut, a resilient sealing member disposed between each bearing nut and its associated collar, a caliper arm secured to the outer end of each offset shaft whereby each arm is adapted to swing outwardly from the main shaft responsive to shaft rotation from a first angular position to a second angular position, a latching device for holding said main shaft in said first angular position, means biasing said main shaft toward said second angular position, means for releasing said latching device to permit the main shaft to move toward said second angular position responsive to the action of said biasing means, and a telemetering device for indicating the angular position of said main shaft.

8. A logging caliper comprising, in combination, a casing, a main shaft journalled therein, a worm gear mounted on said shaft, a plurality of shafts journalled in said casing in offset relation to said main shaft, a gear on each offset shaft meshing with the worm gear on said main shaft, a bearing nut in said casing for accommodating each of said shafts, a collar on each shaft closely spaced to said bearing nut, a resilient sealing member disposed between each bearing nut and its associated collar, a caliper arm secured to the outer end of each offset shaft whereby each arm is adapted to swing outwardly from the main shaft responsive to shaft rotation from a first angular position to a second angular position, a latching device for holding said main shaft in said first angular position, means biasing said main shaft toward said second angular position, means for releasing said latching device to permit the main shaft to move toward said second angular position responsive to the action of said biasing means, and a telemetering device for indicating the angular position of said main shaft.

9. A logging caliper comprising, in combination, a casing, a shaft journalled therein, a series of caliper arms geared to said shaft and adapted to swing outwardly therefrom responsive to shaft rotation from a first angular position to a second angular position, a resistance element encircling said shaft and carried by said casing, a contactor carried by said shaft and engageable with said resistance element, a cam fixed to said shaft, a pivoted roller arm carried by said casing to latch said cam and thereby said shaft in its first angular position, relay actuated means for releasing said roller arm from engagement with said cam, and a pair of coil springs encircling said shaft to urge it toward said second angular position upon release of said arm through energization of said relay actuated means.

10. A logging caliper comprising, in combination, a casing, a shaft journalled therein, a series of caliper arms geared to said shaft and adapted to swing outwardly therefrom responsive to shaft rotation from a first angular position to a second angular position, a resistance element encircling said shaft and carried by said casing, a contactor carried by said shaft and engageable with said resistance element, a cam fixed to said shaft, a pivoted roller arm carried by said casing to latch said shaft in its first angular position, a stop cooperating with said cam to prevent rotation thereof beyond said second angular position, means for releasing said roller arm from engagement with said cam including an electromagnetic coil, an armature therefor, and a pin fixed to said roller arm for engagement by said armature when the coil is energized, and a pair of coil springs encircling said shaft to urge it toward said second angular position upon release of said arm through energization of said coil.

11. A logging caliper comprising, in combination, a liquid tight casing, a main shaft journalled therein, a worm gear mounted on said shaft, a plurality of bearing nuts in said casing spaced around said shaft, a stub shaft journalled in each bearing nut and offset from the main shaft, a gear on each stub shaft meshing with the worm gear on the main shaft, means for sealing the region between the casing and each stub shaft, a caliper arm secured to the outer end of each stub shaft whereby each arm is adapted to swing outwardly from the main shaft responsive to shaft rotation from a first angular position to a second angular position, a resistance element encircling said main shaft and carried by said casing, a contactor carried by said main shaft and engageable with said resistance element, a cam fixed to said main shaft, a pivoted roller arm carried by said casing to latch said cam and thereby the main shaft in its first angular position, relay actuated means for releasing said roller arm from engagement with said cam, and means for urging said main shaft toward said second angular position upon release of said arm through energization of said relay actuated means.

12. A logging caliper comprising, in combination, a casing, a main shaft journalled therein, a worm gear mounted on said shaft, a plurality of bearing nuts in said casing spaced around said shaft, a stub shaft journalled in each bearing nut and offset from the main shaft, a gear on each stub shaft meshing with the worm gear on the main shaft, a collar on each stub shaft closely spaced to the associated bearing nut, a resilient sealing member disposed between each bearing nut and its associated collar, a caliper arm secured to the outer end of each stub shaft whereby each arm is adapted to swing outwardly from the main shaft responsive to shaft rotation from a first angular position to a second angular position, a resistance element encircling said main shaft and carried by said casing, a contactor carried by said main shaft and engageable with said resistance element, a cam fixed to said main shaft, a pivoted roller arm carried by said casing to latch said main shaft in its first angular position, a stop cooperating with said cam to prevent rotation thereof beyond said second angular position, relay actuated means for releasing said roller arm from engagement with said cam, and a pair of coil springs encircling said main shaft to urge it toward said second angular position upon release of said arm through energization of said relay actuated means.

13. A logging caliper comprising, in combination, a casing, a main shaft journalled therein, a worm gear mounted on said shaft, a plurality of bearing nuts in said casing spaced around said shaft, a stub shaft journalled in each bearing nut and offset from the main shaft, a gear on each stub shaft meshing with the worm gear on the main shaft, a collar on each stub shaft closely spaced to the associated bearing nut, a resilient sealing member disposed between each bearing nut and its associated collar, a caliper arm secured to the outer end of each stub shaft whereby each arm is adapted to swing outwardly from the main shaft responsive to shaft rotation from a first angular position to a second angular position, a resistance element encircling said main shaft and carried by said casing, a contactor carried by said main shaft and engageable with said resistance element, a cam fixed to said main shaft, a pivoted roller arm carried by said casing to latch said main shaft in its first angular position, a stop cooperating with said cam to prevent rotation thereof beyond said second angular position, means for releasing said roller arm from engagement with said cam including an electromagnetic coil, an armature therefor, and a pin fixed to said roller arm for engagement by said armature when the coil is energized, and a pair of coil springs encircling said main shaft to urge it toward said second angular position upon release of said arm through energization of said electromagnetic coil.

BRUCE F. WILEY.

REFERENCES CITED

The following references are of record in the file of this patent:

UNITED STATES PATENTS

| Number | Name | Date |
| --- | --- | --- |
| 1,605,923 | Darlington | Nov. 9, 1926 |
| 2,018,550 | Freeman et al. | Oct. 22, 1935 |
| 2,030,244 | Cox | Feb. 11, 1936 |
| 2,150,070 | Kregecz | Mar. 7, 1939 |
| 2,340,987 | Robidoux | Feb. 8, 1944 |

FOREIGN PATENTS

| Number | Country | Date |
| --- | --- | --- |
| 613,489 | Germany | May 23, 1935 |